United States Patent
Shiohara et al.

(10) Patent No.: US 10,848,016 B2
(45) Date of Patent: Nov. 24, 2020

(54) MAGNETIC POWDER DUST CORE WITH ENTIRELY BURIED COIL OR MAGNET

(71) Applicant: Seiko Epson Corporation, Tokyo (JP)

(72) Inventors: Yukihiko Shiohara, Hachinohe (JP); Hidefumi Nakamura, Hachinohe (JP); Isamu Otsuka, Hachinohe (JP)

(73) Assignee: Seiko Epson Corporation

( * ) Notice: Subject to any disclaimer, the term of this patent is extended or adjusted under 35 U.S.C. 154(b) by 704 days.

(21) Appl. No.: 15/245,531

(22) Filed: Aug. 24, 2016

(65) Prior Publication Data

US 2017/0063172 A1   Mar. 2, 2017

(30) Foreign Application Priority Data

Aug. 26, 2015   (JP) ................. 2015-167192

(51) Int. Cl.
*H02K 1/12* (2006.01)
*H02K 1/27* (2006.01)
*H02K 1/14* (2006.01)
*H02K 1/02* (2006.01)

(52) U.S. Cl.
CPC ............ *H02K 1/12* (2013.01); *H02K 1/02* (2013.01); *H02K 1/146* (2013.01); *H02K 1/27* (2013.01)

(58) Field of Classification Search
CPC ........... H02K 1/12; H02K 1/02; H02K 1/146; H02K 1/06; H02K 1/17; H02K 1/27; H02K 1/276; H02K 3/44; H02K 3/47
USPC .......... 310/44, 43, 45, 179, 208, 42, 154.11, 310/156.53, 156.57, 216.067, 259, 258, 310/254
See application file for complete search history.

(56) References Cited

U.S. PATENT DOCUMENTS

| 5,536,985 A | * | 7/1996 | Ward | H02K 1/22 310/179 |
| 5,912,519 A | * | 6/1999 | Homer | F16F 15/30 310/74 |
| 6,232,681 B1 | * | 5/2001 | Johnston | H02K 1/12 29/596 |
| 9,536,653 B2 | * | 1/2017 | Yamada | H01F 27/2823 |

(Continued)

FOREIGN PATENT DOCUMENTS

| JP | 2003-052142 A | 2/2003 |
| JP | 2004-254421 A | 9/2004 |

(Continued)

OTHER PUBLICATIONS

JP4514031B2 English Translation.*
JP-2004254421-A English Translation.*

*Primary Examiner* — Maged M Almawri
(74) *Attorney, Agent, or Firm* — Harness, Dickey & Pierce, P.L.C.

(57) ABSTRACT

A direct-current electric motor (an electrically powered machine) is a 3-pole brush-equipped direct-current electric motor which is provided with an armature (a rotor), a field element (a stator), a shaft, a commutator, a brush, a bracket, and an end plate. Of these, the armature (an armature) is provided with a dust core configured with a compressed powder compact formed of magnetic powder, and a coil buried in the dust core. On the other hand, the field element is provided with a field magnet which generates a magnetic flux, and a yoke housing which supports the field magnet and also functions as a housing.

6 Claims, 11 Drawing Sheets

(56) References Cited

U.S. PATENT DOCUMENTS

| | | | | |
|---|---|---|---|---|
| 2003/0057796 A1* | 3/2003 | Fan | ............ | H02K 1/148 310/216.062 |
| 2004/0212256 A1* | 10/2004 | Sugishima | ............ | H02K 1/146 310/44 |
| 2005/0285470 A1* | 12/2005 | Itoh | ............ | H02K 3/26 310/208 |
| 2010/0277011 A1* | 11/2010 | Kaneto | ............ | B82Y 25/00 310/26 |
| 2011/0024671 A1* | 2/2011 | Otsuki | ............ | B22F 1/02 252/62.54 |
| 2011/0148224 A1* | 6/2011 | Tokoi | ............ | H02K 1/2793 310/43 |
| 2012/0126637 A1 | 5/2012 | Ankeney et al. | | |
| 2013/0249664 A1* | 9/2013 | Tonoyama | ............ | H01F 27/255 336/200 |
| 2014/0084716 A1* | 3/2014 | Bernot | ............ | H02K 19/06 310/46 |
| 2014/0368304 A1* | 12/2014 | Araki | ............ | B22F 1/02 335/296 |
| 2017/0244293 A1* | 8/2017 | Kanda | ............ | H02K 1/02 |
| 2017/0321308 A1* | 11/2017 | Takahashi | ............ | B22F 1/00 |
| 2018/0062464 A1* | 3/2018 | Imfeld | ............ | H02K 1/2773 |
| 2018/0200787 A1* | 7/2018 | Saito | ............ | B22F 3/24 |

FOREIGN PATENT DOCUMENTS

| | | |
|---|---|---|
| JP | 2004254421 A * | 9/2004 |
| JP | 2006-339525 A | 12/2006 |
| JP | 2010-232225 A | 10/2010 |
| JP | 2012-115138 A | 6/2012 |
| JP | 2013-074728 A | 4/2013 |
| JP | 2013-201375 A | 10/2013 |
| JP | 2014-130879 A | 7/2014 |

* cited by examiner

MAGNETIC POWDER DUST CORE WITH ENTIRELY BURIED COIL OR MAGNET

CROSS-REFERENCE TO RELATED APPLICATIONS

This application claims priority to Japanese Patent Application No. 2015-167192 filed on Aug. 26, 2015. The entire disclosure of Japanese Patent Application No. 2015-167192 is hereby incorporated herein by reference.

BACKGROUND

1. Technical Field

The present invention relates to an armature, a field element, a method of manufacturing an armature, a method of manufacturing a field element, and an electrically powered machine.

2. Related Art

An electrically powered machine such as an electric motor (a motor), a power generator (a generator), or an electric motor-generator (a motor-generator) having the functions of both the electric motor and the power generator is used in many equipment including a vehicle such as an electric automobile or a hybrid automobile.

Such an electrically powered machine is provided with a stator having a cylindrical shape, and a rotor rotatably provided inside of the stator. A magnetic flux is supplied by the stator, and the magnetic flux acts on the rotor, thereby generating an electromagnetic force or an induced electromotive force. In this case, the stator is a field element and the rotor serves as an armature.

The armature is provided with a core-equipped coil which includes a core and a coil, and the field element is provided with a permanent magnet-equipped core which includes a core and a permanent magnet. Of these, as the core, a laminated core which is configured by laminating a plurality of electromagnetic steel sheets is known (refer to, for example, JP-A-2003-52142). Each electromagnetic steel sheet is composed of a soft magnetic material and the surface thereof is electrically insulated. In this way, it is possible to suppress an eddy current which flows through the core, and thus it is possible to enhance the efficiency of an electrically powered machine.

Further, instead of the laminated core, a dust core which is configured by press-forming a composition obtained by mixing insulation-treated magnetic powder and resin is known (refer to, for example, JP-A-2006-339525). In the dust core, since an eddy current generation region is subdivided, a pathway through which an eddy current flows is shortened, and thus an eddy current loss in an electrically powered machine is suppressed to be small.

However, the dust core has low mechanical strength, and therefore, when the coil is wound, there is a concern that the dust core may be chipped or broken. For this reason, in the past, the dust core has been often used in a product in which it is difficult for a load to be applied thereto, like an inductor, and on the other hand, it has not been used in a product in which it is easy for a load to be applied thereto, like a field element or an armature of an electrically powered machine.

SUMMARY

An advantage of some aspects of the invention is to provide an armature and a field element, which can realize an electrically powered machine having high efficiency, an armature manufacturing method capable of manufacturing the armature, a field element manufacturing method capable of manufacturing the field element, and an electrically powered machine having high efficiency.

The advantage can be achieved by the following configuration.

An armature according to an aspect of the invention includes: a dust core which includes magnetic powder; and a coil buried in the dust core.

With this configuration, it is possible to suppress an eddy current loss and effectively utilize a magnetic flux, and therefore, an armature capable of realizing an electrically powered machine having high efficiency is obtained.

In the armature according to the aspect of the invention, it is preferable that the magnetic powder includes a plurality of particles each composed of a soft magnetic material, and an insulating layer which covers the surface of each particle.

With this configuration, even in a case where the particles come into contact with each other, electrical conduction between the particles of the soft magnetic material is prevented, and thus an insulation property between the particles can be prevented from being reduced. As a result, in the dust core, an eddy current generation region is subdivided, and thus an eddy current loss can be suppressed to be small.

In the armature according to the aspect of the invention, it is preferable that the insulating layer includes a glass material.

With this configuration, an insulating layer which is excellent in chemical stability and insulation property and can maintain a high insulation property over a long period of time is obtained.

In the armature according to the aspect of the invention, it is preferable that the dust core has a columnar shape or a cylindrical shape.

With this configuration, it is difficult for deformation to occur, and at the time of forming, forming with a large compressive force becomes possible. Therefore, a dust core having high magnetic property and high mechanical strength is obtained.

In the armature according to the aspect of the invention, it is preferable that the coil includes a winding section which is configured by winding a conducting wire, and terminal sections which are configured at both end portions of the conducting wire, and the entirety of the winding section is buried in the dust core.

With this configuration, it becomes possible to fill an area between the conducting wires of the winding section with magnetic powder, and therefore, it becomes difficult for a gap to be formed between the coil and the dust core, and thus passage of a magnetic flux becomes easy. As a result, even a magnetic flux which has not been able to be utilized hitherto can be used for the driving of an electrically powered machine, and thus it is possible to attain higher efficiency and higher torque of the electrically powered machine.

A field element according to another aspect of the invention includes: a dust core which includes magnetic powder; and a permanent magnet buried in the dust core.

With this configuration, it is possible to effectively utilize a magnetic flux, and therefore, a field element capable of realizing an electrically powered machine having high efficiency is obtained.

A method of manufacturing an armature according to still another aspect of the invention includes: disposing a coil in a cavity of a forming die; supplying magnetic powder into the cavity; and compacting the magnetic powder.

With this configuration, it is possible to manufacture an armature capable of realizing an electrically powered machine having high efficiency.

A method of manufacturing a field element according to yet another aspect of the invention includes: disposing a permanent magnet in a cavity of a forming die; supplying magnetic powder into the cavity; and compacting the magnetic powder.

With this configuration, it is possible to manufacture a field element capable of realizing an electrically powered machine having high efficiency.

An electrically powered machine according to still yet another aspect of the invention includes: the armature according to the aspect of the invention, or the field element according to the aspect of the invention.

With this configuration, an electrically powered machine having high efficiency can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an armature, a field element, a method of manufacturing an armature, a method of manufacturing a field element, and an electrically powered machine according to the invention will be described in detail based on preferred embodiments shown in the accompanying drawings.

Electrically Powered Machine

First Embodiment

First, a first embodiment of an electrically powered machine according to the invention will be described. In addition, in this specification, an "electrically powered machine" refers to an electric motor (a motor), a power generator (a generator), or an electric motor-generator (a motor-generator) having the functions of both the electric motor and the power generator.

Figure 1:
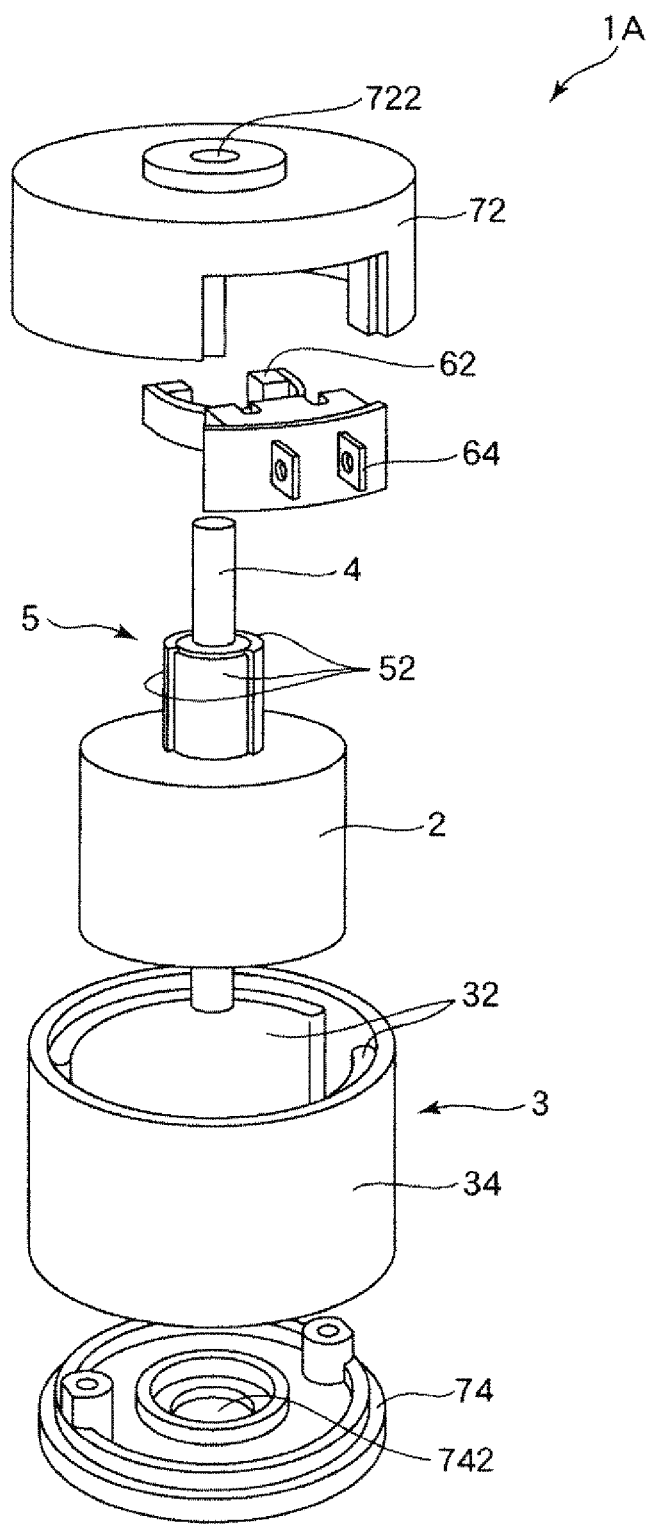
FIG. 1 is an exploded perspective view showing a direct-current electric motor (a DC motor) to which a first embodiment of an electrically powered machine according to the invention is applied.
Figure 2:
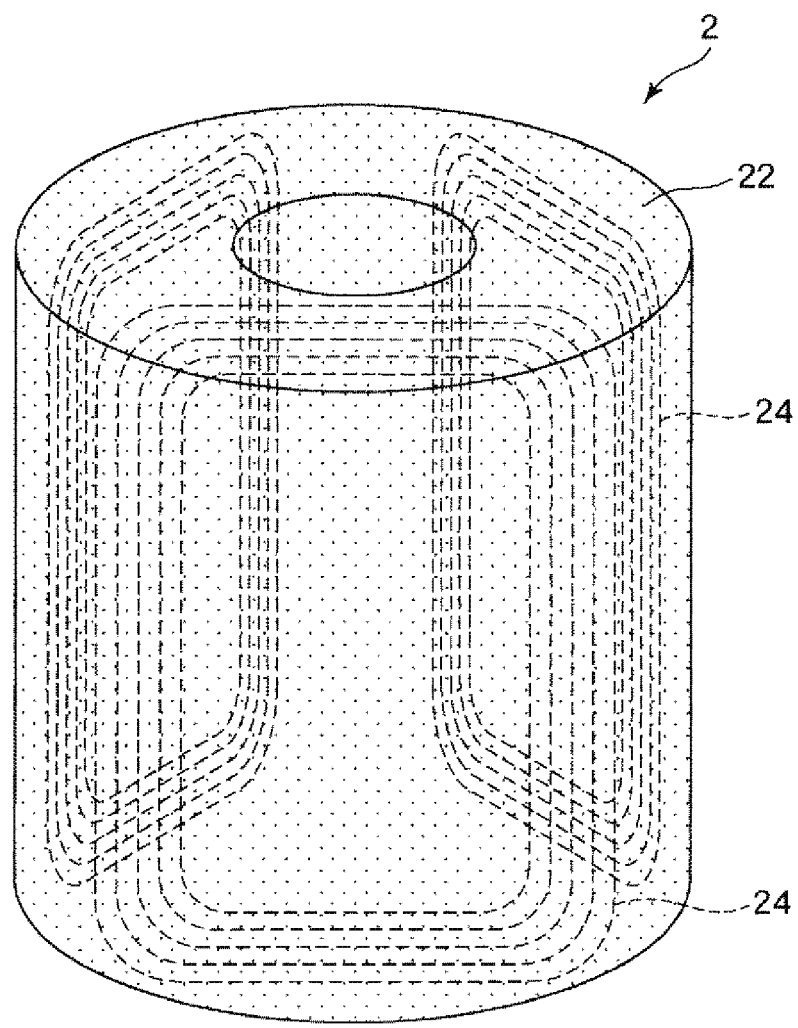
FIG. 2 is a transparent perspective view showing an armature of the direct-current electric motor shown in FIG. 1.
Figure 3:
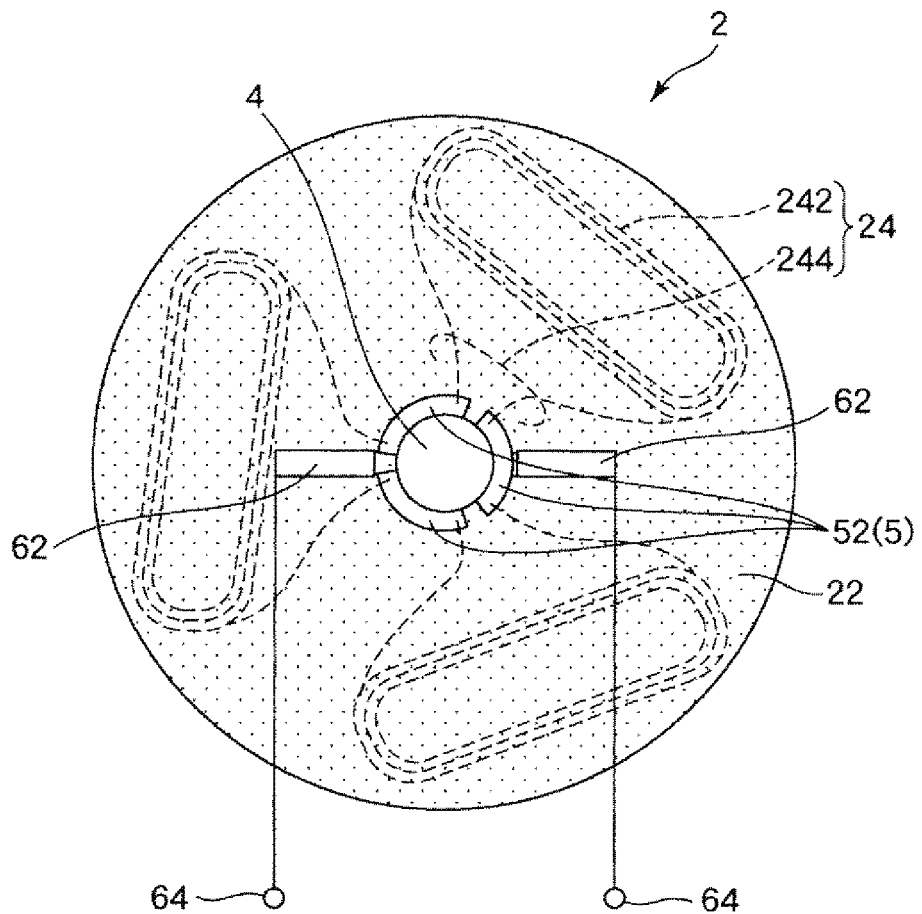
FIG. 3 is a plan view when the armature shown in FIG. 2 is viewed from an extended line of a rotary shaft, and is a diagram showing such an armature, and a shaft, a commutator, and a brush which are associated with the armature.
Figure 4:
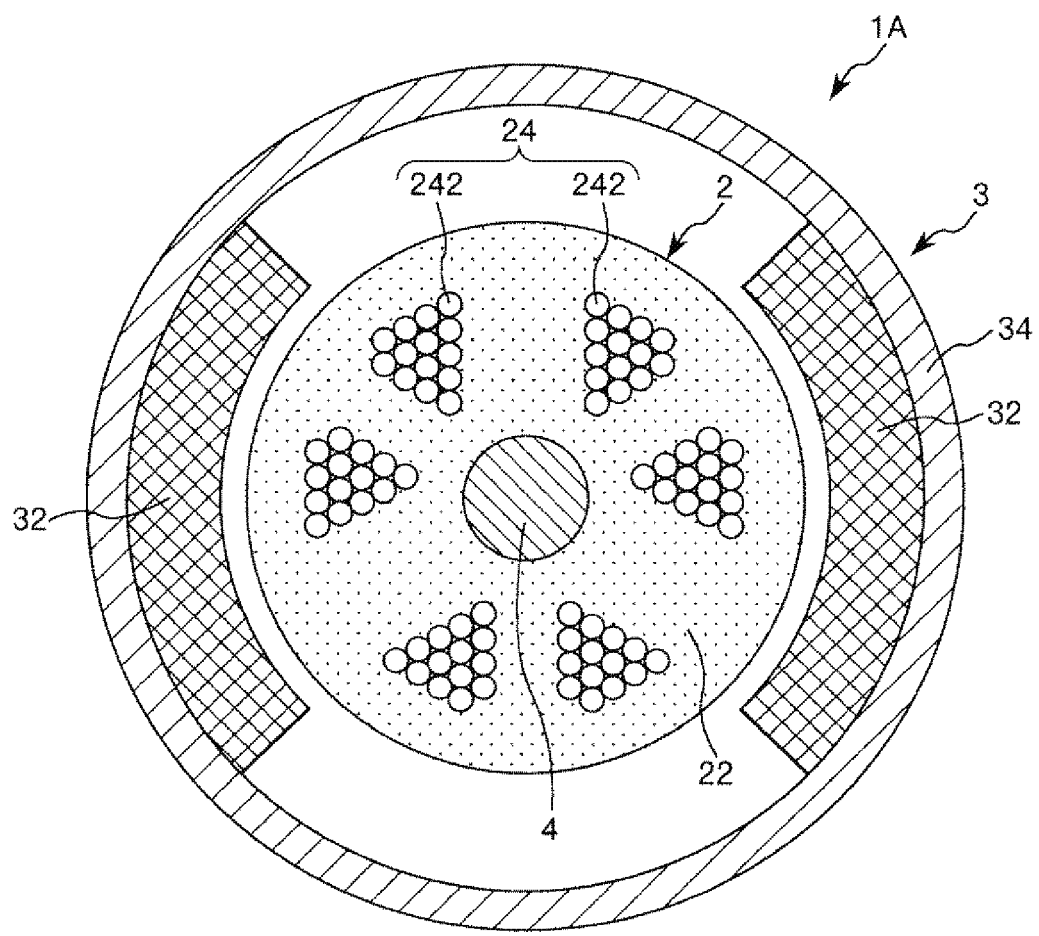
FIG. 4 is a cross-sectional view when the direct-current electric motor shown in FIG. 1 is cut in a plane orthogonal to the rotary shaft.

FIG. 1 is an exploded perspective view showing a direct-current electric motor (a DC motor) to which the first embodiment of the electrically powered machine according to the invention is applied. Further, FIG. 2 is a transparent perspective view showing an armature of the direct-current electric motor shown in FIG. 1, and FIG. 3 is a plan view when the armature shown in FIG. 2 is viewed from an extended line of a rotary shaft, and is a diagram showing such an armature, and a shaft, a commutator, and a brush which are associated with the armature. Further, FIG. 4 is a cross-sectional view when the direct-current electric motor shown in FIG. 1 is cut in a plane orthogonal to the rotary shaft.

A direct-current electric motor 1A shown in FIG. 1 is a 3-pole brush-equipped direct-current electric motor which is provided with an armature 2 (a rotor), a field element 3 (a stator), a shaft 4, a commutator 5, a brush 62, a bracket 72, and an end plate 74. Hereinafter, each section of the direct-current electric motor 1A will be described in detail. In addition, in this specification, in a case where the direct-current electric motor 1A is used as a motor (an electric motor), a section to which electrical energy is supplied from a power supply is referred to as an "armature", and a section which generates a magnetic flux is referred to as a "field element".

The shaft 4 is supported on a bearing 722 provided in the bracket 72, and a bearing 742 provided in the end plate 74. Further, the shaft 4 penetrates the armature 2, serves as a rotary shaft of the armature 2, and also serves as an output shaft of the direct-current electric motor 1A.

The armature 2 (an embodiment of the armature according to the invention) is provided with a dust core 22 (a core) configured with a compressed powder compact formed of magnetic powder, and three coils 24 buried in the dust core 22. The armature 2 is also referred to as an "induction coil". In FIGS. 2 and 3, the coils 24 buried in the dust core 22 are shown by broken lines.

Of these, the dust core 22 has a cylindrical shape, and the shaft 4 is inserted on the inner diameter side of the cylinder. The dust core 22 is configured with a compressed powder compact formed of magnetic powder. Further, particles of the magnetic powder are insulated from each other. For this reason, an eddy current loss is suppressed, and thus the direct-current electric motor 1A having high efficiency is obtained. Further, the shape of the dust core 22 is not limited to a cylindrical shape and may be a columnar shape, a rectangular tube shape, a rectangular column shape, or the like.

Further, the coil 24 is provided with a winding section 242 (refer to FIG. 3) which is configured by winding a conducting wire into a ring shape, and terminal sections 244 (refer to FIG. 3) which are configured at both end portions of the conducting wire of each winding section 242. In FIGS. 2 and 3, the coils 24 are shown in a simplified manner.

Here, the coil 24 is buried in the dust core 22. That is, the coil 24 is not present in a state of being wound with respect to, for example, a bulk core, and the winding section 242 configured by being wound in the form of an independent ring is prepared in advance. Further, when the dust core 22 is formed by a forming die, the dust core 22 is formed (insert-molded) in a state where the winding section 242 is put in a cavity, whereby the dust core 22 with the winding section 242 buried therein is obtained.

In the armature 2 as described above, individual work to wind a conducting wire with respect to a core is not required, and therefore, manufacturing efficiency is high.

Further, it is possible to determine the outer shape of the dust core 22 without taking into account the presence of the coil 24, and therefore, it is possible to select a simple shape such as a columnar shape or a cylindrical shape. In the dust core 22 having such a shape, deformation such as so-called spring-back does not easily occur, and therefore, at the time of forming, accordingly, forming with a large compressive force is possible. For this reason, it becomes easy to easily enhance the magnetic property and the mechanical strength of the dust core 22. In this way, even if it is used in a use in which it is easy for a load to be applied, like the armature 2, the dust core 22 capable of realizing the armature 2 having sufficient durability and high dynamic characteristics is obtained.

Further, it is not necessary to wind a conducting wire with respect to a core, and therefore, it becomes easy to increase the degree of freedom of the shape of the coil 24, and it is possible to increase the density of the coils 24 which are included in, for example, the armature 2. In this way, it become easy to increase the output or the torque of the direct-current electric motor 1A.

Further, it is not necessary to wind a conducting wire with respect to a core, and therefore, it is not necessary to provide a slot in the core, and it becomes possible to fill an area between the conducting wires of the winding section 242 with magnetic powder. For this reason, it becomes difficult for a gap to be formed between the coil 24 and the dust core 22, and thus passage of a magnetic flux becomes easy. In this way, even a magnetic flux which has not been able to be utilized hitherto can be used for the driving of the direct-current electric motor 1A, and thus it is possible to attain higher efficiency or higher torque of the direct-current electric motor 1A. Further, in a case of winding a conducting wire with respect to a bulk core, a slight gap is easily formed between the core and the conducting wire. Further, in a case of winding a conducting wire while applying high tension thereto in order to eliminate a gap as much as possible, a large frictional force acts between the core and the conducting wire, and thus there is a concern that a coated insulating film of the conducting wire may be peeled off or the core may be damaged. In contrast, according to this embodiment, it is possible to solve such a problem.

Further, in this embodiment, the entirety of the winding section 242 of the coil 24 is buried in the dust core 22. However, the invention is not limited thereto, and the terminal sections 244 may also be buried. In this case, a portion of the commutator 5 may also be buried in the dust core 22 so as to electrically connect the terminal section 244 and the commutator 5 in the dust core 22.

In addition to the above, the coil 24 is buried in the dust core 22, whereby it becomes difficult for the coil 24 to be exposed to the external environment. For this reason, it is possible to reduce the probability that the coil 24 will be oxidized or deteriorated under the influence of moisture. As a result, it is possible to increase the life of the direct-current electric motor 1A.

Furthermore, the shape of the dust core 22 can be freely selected, and therefore, it is possible to make, for example, the smoothness of the surface very high. Moreover, the coil 24 is buried, and therefore, it is difficult for the influence of the shape of the coil 24 to appear on the surface of the dust core 22. As a result, in the dust core 22, a loss (a windage loss) due to fluid resistance which the dust core 22 receives from air at the time of rotation can be suppressed to be sufficiently small. For this reason, also in such a viewpoint, it is possible to attain higher efficiency of the direct-current electric motor 1A.

From the above, the coil 24 is buried in the dust core 22, whereby a reduction in loss, an increase in performance, and an increase in life are attained, and it is possible to realize the direct-current electric motor 1A having high efficiency.

Further, the shaft 4 may be inserted on the inner diameter side of the dust core 22 after the dust core 22 is formed. However, when fabricating the dust core 22, the shaft 4 may also be inserted by putting it in a cavity of a forming die along with the coil 24 and performing insert molding.

Further, the magnetic powder which is included in the dust core 22 includes a soft magnetic material. As the soft magnetic material, in addition to pure iron and various Fe-based alloys such as silicon steel (Fe—Si-based alloy), permalloy (Fe—Ni-based alloy), permendur (Fe—Co-based alloy), a Fe—Si—Al-based alloy such as sendust, and a Fe—Cr—Si-based alloy, various Ni-based alloys, various Co-based alloys, various amorphous alloys, various metallic glass, a ferrite, or the like can be given as an example. Among these, various Fe-based alloys are preferably used from the point of view of magnetic properties such as magnetic permeability and magnetic flux density, or productivity such as a cost, and a ferrite is preferably used from the point of view of a cost or weather resistance.

The average particle size of the magnetic powder is not particularly limited. However, it is preferable that the average particle size is in a range of greater than or equal to 0.5 μm and less than or equal to 30 μm, and it is more preferable that the average particle size is in a range of greater than or equal to 1 μm and less than or equal to 20 μm. By setting the average particle size of the magnetic powder to be within the above-described range, it is possible to achieve both the higher density of the dust core 22 and the suppression of an eddy current loss. Further, if the average particle size of the magnetic powder falls below the above lower limit, it becomes difficult to attain higher density by compacting, and therefore, there is a concern that the mechanical strength of the dust core 22 may be reduced. On the other hand, if the average particle size of the magnetic powder exceeds the above upper limit, there is a concern that it may become difficult to suppress an eddy current loss which occurs in the particle of the magnetic powder.

Further, the average particle size of the magnetic powder is determined as a particle size when the cumulative amount from the small diameter side amounts to 50% on a mass basis in a particle size distribution obtained by a laser diffraction type particle size distribution measuring device.

Further, if the average particle size of the magnetic powder is within the above-described range, it is preferable that the maximum particle size of the magnetic powder is less than or equal to 200 µm, and it is more preferable that the maximum particle size is less than or equal to 150 µm. By setting the maximum particle size of the magnetic powder to be within the above-described range, an eddy current loss is particularly suppressed, and thus it is possible to obtain the armature 2 having high efficiency.

Further, the maximum particle size of the magnetic powder is determined as a particle size when the cumulative amount from the small diameter side amounts to 99.9% on a mass basis in a particle size distribution obtained by a laser diffraction type particle size distribution measuring device.

Further, as described above, the magnetic powder which is included in the dust core 22 is provided with an insulating layer which covers the surface of the particle. In this way, the particles of the magnetic powder are insulated from each other. For this reason, an eddy current loss is suppressed, and thus the direct-current electric motor 1A having high efficiency is obtained.

The field element 3 is provided with a field magnet 32 which generates a magnetic flux, and a yoke housing 34 which also functions as a yoke supporting the field magnet 32 and also functions as a housing accommodating the field magnet 32 or the armature 2.

Of these, the field magnet 32 shown in FIG. 1 is configured with a permanent magnet. Two field magnets 32 are disposed on the inner surface of the yoke housing 34 shown in FIG. 1. Then, on the surfaces facing each other, the field magnets 32 are disposed such that magnetic poles different from each other appear.

Further, the yoke housing 34 shown in FIG. 1 is composed of a material capable of forming a magnetic circuit between the yoke housing 34 and the two field magnets 32. Along with this, the yoke housing 34 also functions as a housing having a cylindrical shape, thereby protecting the field magnets 32 or the armature 2 accommodated therein from the external environment.

The commutator 5 includes three commutator segments 52 disposed so as to surround the side surface of the shaft 4. The commutator segments 52 are electrically connected to the three coils 24. Then, the three commutator segments 52 slide while coming into contact with the brushes 62, whereby it is possible to switch an electric current flowing from the brush 62 side, one after another between the three commutator segments 52 rotating along with the shaft 4.

In this way, if an electric current flows through the coil 24, the dust core 22 is magnetized, and thus an attraction force or a repulsive force is generated between the dust core 22 and the field magnet 32. At this time, if the commutator 5 rotates along with the shaft 4, switching between the attraction force and the repulsive force is performed, and a rotating force is generated based on this.

The brush 62 is supported by the bracket 72 and comes into sliding contact with the commutator 5, as described above. In the direct-current electric motor 1A shown in FIG. 1, two brushes 62 are provided and are disposed so as to face each other in a direction orthogonal to the rotary shaft.

Further, a terminal 64 is electrically connected to each brush 62, as shown in FIG. 3. The terminal 64 serves as an input terminal of the direct-current electric motor 1A. Further, in a case where the direct-current electric motor 1A is used as a power generator, the terminal 64 serves as an output terminal.

The bracket 72 is a member which blocks an opening on one side of the yoke housing 34 having a cylindrical shape. The bracket 72 is provided with the bearing 722 which is configured with a through-hole, and the shaft 4 is inserted into the bearing 722.

Further, the end plate 74 is a member which blocks an opening on the other side of the yoke housing 34 having a cylindrical shape. The end plate 74 is provided with the bearing 742 which is configured with a recess portion, and the shaft 4 is plugged in the bearing 742.

The direct-current electric motor 1A has been described above. However, the output of the electrically powered machine according to the invention is not limited to rotational motion and may be linear motion. That is, the electrically powered machine according to the invention may be a so-called linear motor. Also in the linear motor, an armature and a field element are used, and therefore, the above-described technique can be applied thereto. Therefore, it is possible to exhibit the above-described effects.

Second Embodiment

Next, a second embodiment of the electrically powered machine according to the invention will be described.

Figure 5:
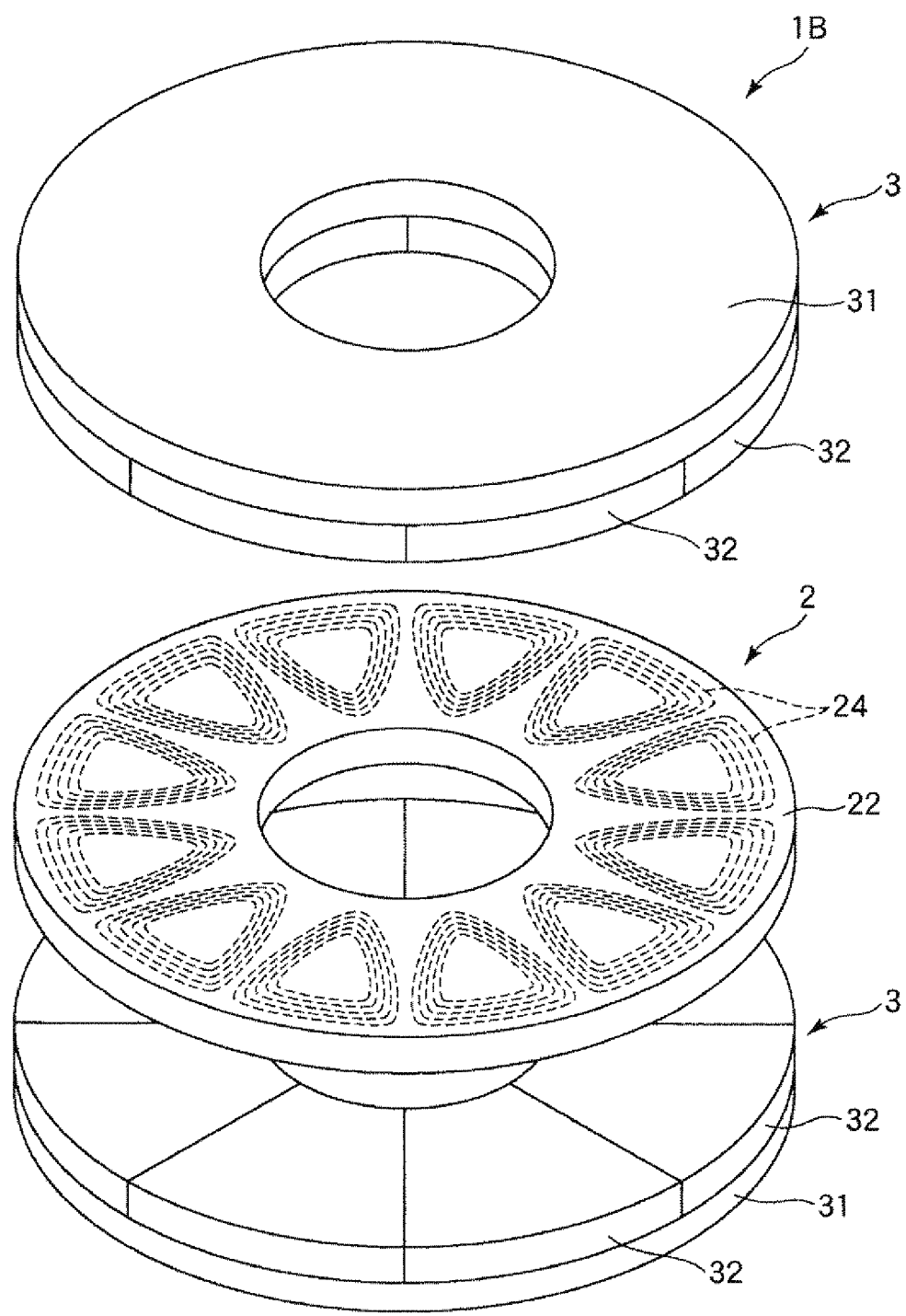
FIG. 5 is an exploded perspective view showing an axial gap type brushless direct-current electric motor to which a second embodiment of the electrically powered machine according to the invention is applied.

FIG. 5 is an exploded perspective view showing an axial gap type brushless direct-current electric motor to which the second embodiment of the electrically powered machine according to the invention is applied.

Hereinafter, the second embodiment will be described. However, in the following description, description will be made focusing on differences from the first embodiment described above, and with respect to the same matters, description thereof will be omitted. Further, in the drawing, the same matters as those in the embodiment described above are denoted by the same reference numerals.

An axial gap type brushless direct-current electric motor 1B (hereinafter referred to as an "AG type brushless direct-current electric motor 1B" for brevity) according to this embodiment is the same as the direct-current electric motor 1A according to the first embodiment except that the configuration of a gap separating a rotor and a stator from each other is different from each other and the direct-current electric motor 1B is of a brushless type. That is, the AG type brushless direct-current electric motor 1B according to this embodiment is different from the direct-current electric motor 1A according to the first embodiment in that the direct-current electric motor 1A is a radial gap type brush-equipped direct-current electric motor in which a gap separating the rotor and the stator from each other is located along a radial direction of the rotary shaft, whereas the AG type brushless direct-current electric motor 1B is an axial gap type brushless direct-current electric motor in which a gap separating the rotor and the stator from each other is located along the same direction as an extending direction of the rotary shaft.

The AG type brushless direct-current electric motor 1B shown in FIG. 5 is a brushless direct-current electric motor which is provided with the armature 2 and two field elements 3. Hereinafter, each section of the AG type brushless direct-current electric motor 1B will be described in detail. In FIG.

5, the illustration of the configurations (for example, the shaft and the like) other than the armature 2 and the field element 3 is omitted.

The armature 2 shown in FIG. 5 is sandwiched between the two field elements 3, each of which functions as a rotor, and functions as a stator. The armature 2 is provided with the dust core 22 and twelve coils 24 buried in the dust core 22. In FIG. 5, the coils 24 buried in the dust core 22 are shown in a simplified manner by broken lines.

On the other hand, each of the two field elements 3 is provided with a plate 31 having a cylindrical shape which is thin in the extending direction of the rotary shaft, and the field magnet 32 provided on the principal surface on the armature 2 side, out of two principal surfaces of the plate 31.

The dust core 22 shown in FIG. 5 has a cylindrical shape which is thin in the extending direction of the rotary shaft, and a shaft (not shown) is inserted on the inner diameter side of the cylinder. The dust core 22 is used, whereby an eddy current loss is suppressed, and thus the AG type brushless direct-current electric motor 1B having high efficiency is obtained.

Further, the twelve coils 24 are disposed so as to surround the rotary shaft. Then, voltage is applied to each coil 24 through, for example, an inverter. At this time, the position of the armature 2 with respect to the field element 3 is detected by a sensor or the like, and the voltage which is applied to each coil 24 is switched based on the position. In this way, a rotating force is applied to the armature 2.

According to the armature 2 according to this embodiment, the same effects as the armature 2 according to the first embodiment are obtained. The armature 2 according to this embodiment can be manufactured by insert molding, and therefore, individual work to embed the coil 24 is not required, and thus manufacturing efficiency is high.

Further, it is possible to determine the outer shape of the dust core 22 without taking into account the presence of the coil 24, and therefore, it is possible to select a simple shape such as a cylindrical shape. In the dust core 22 having such a shape, at the time of forming thereof, forming with a large compressive force is possible, and it is easy to easily enhance the magnetic property and the mechanical strength. In this way, even if it is used in a use in which it is easy for a load to be applied, like the armature 2, the dust core 22 capable of realizing the armature 2 having sufficient durability and high dynamic characteristics is obtained.

Further, it becomes possible to fill an area between the conducting wires of the winding section 242 of the coil 24 with magnetic powder. For this reason, it becomes difficult for a gap to be formed between the coil 24 and the dust core 22, and thus passage of a magnetic flux becomes easy. In this way, even a magnetic flux which has not been able to be utilized hitherto can be used for the driving of the AG type brushless direct-current electric motor 1B, and thus it is possible to attain higher efficiency or higher torque of the AG type brushless direct-current electric motor 1B. Further, in a case of winding a conducting wire with respect to a bulk core, a slight gap is easily formed between the core and the conducting wire. Further, in a case of winding a conducting wire while applying high tension thereto in order to eliminate a gap as much as possible, a large frictional force acts between the core and the conducting wire, and thus there is a concern that a coated insulating film of the conducting wire may be peeled off or the core may be damaged. In contrast, according to this embodiment, it is possible to solve such a problem.

Further, it becomes difficult for the coil 24 to be exposed to the external environment, and therefore, time degradation of the coil 24 is suppressed. As a result, it is possible to increase the life of the AG type brushless direct-current electric motor 1B.

Furthermore, the coil 24 is buried, and therefore, it is difficult for the influence of the shape of the coil 24 to appear on the surface of the dust core 22. For this reason, it is possible to bring the armature 2 sufficiently close to the field element 3, and thus it is possible to attain higher efficiency and higher torque of the AG type brushless direct-current electric motor 1B.

Also in the AG type brushless direct-current electric motor 1B which is provided with the armature 2 as described above, the same effects as those in the first embodiment are obtained.

Third Embodiment

Next, a third embodiment of the electrically powered machine according to the invention will be described.

Figure 6:
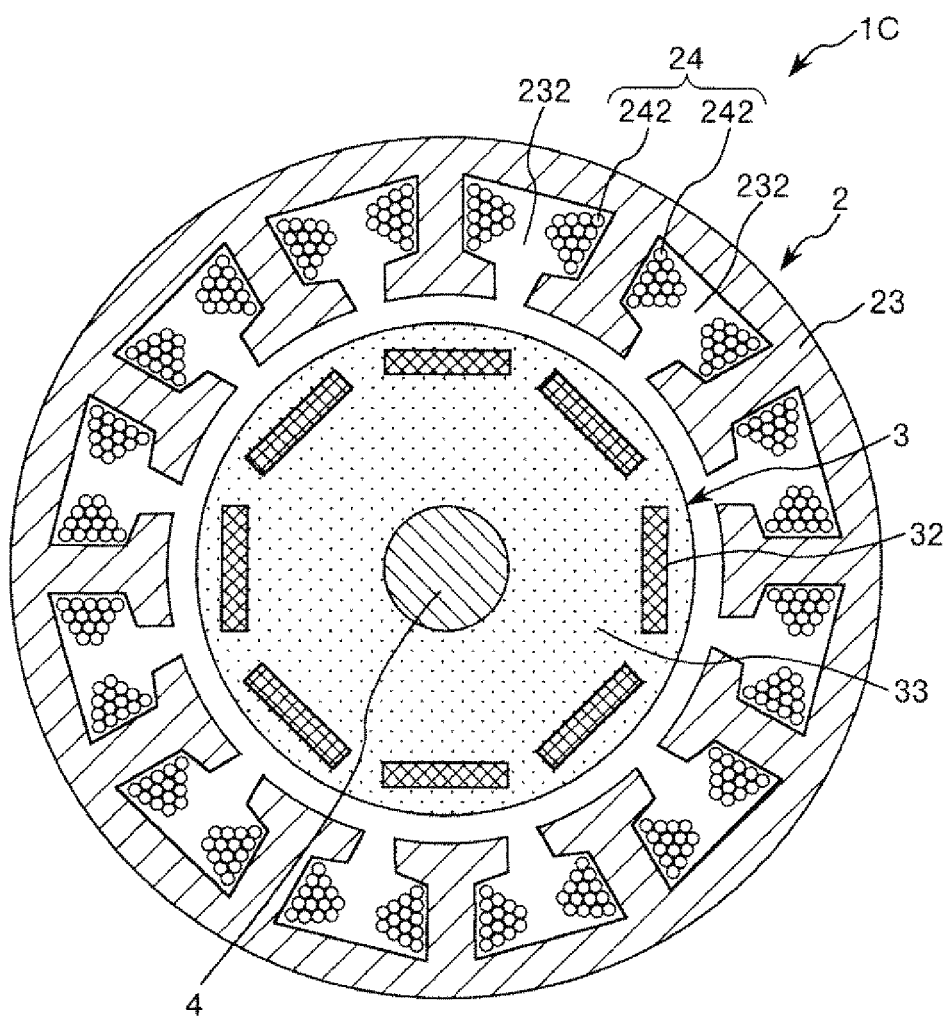
FIG. 6 is a cross-sectional view showing a synchronous electric motor to which a third embodiment of the electrically powered machine according to the invention is applied.

FIG. 6 is a cross-sectional view showing a synchronous electric motor to which the third embodiment of the electrically powered machine according to the invention is applied.

Hereinafter, the third embodiment will be described. However, in the following description, description will be made focusing on differences from the first and second embodiments described above, and with respect to the same matters, description thereof will be omitted. Further, in the drawing, the same matters as those in the embodiments described above are denoted by the same reference numerals.

A synchronous electric motor 1C according to this embodiment is a radial gap type electric motor in which a gap separating the rotor and the stator from each other is located along the radial direction of the rotary shaft, similar to the direct-current electric motor 1A according to the first embodiment.

The synchronous electric motor 1C shown in FIG. 6 is a synchronous electric motor which is provided with the armature 2, the field element 3, and the shaft 4. Then, the synchronous electric motor 1C shown in FIG. 6 is the same as the direct-current electric motor 1A shown in FIG. 4 except that in the synchronous electric motor 1C, unlike the direct-current electric motor 1A, the armature 2 functions as a stator and the field element 3 functions as a rotor.

The armature 2 shown in FIG. 6 is provided with a magnetic core 23 configured with a laminated body of electromagnetic steel sheets, and twelve coils 24 provided inside of the magnetic core 23. A slot 232 is formed in the magnetic core 23, and a conducting wire is contained within the slot 232.

The field element 3 (an embodiment of the field element according to the invention) shown in FIG. 6 is provided with a dust core 33 (a core) configured with a compressed powder compact formed of magnetic powder, and eight field magnets 32 buried in the dust core 33.

Of these, the dust core 33 is the same as the dust core 22 according to the first embodiment. The dust core 33 has a cylindrical shape, and the shaft 4 is inserted on the inner diameter side of the cylinder.

The eight field magnets 32 are disposed at regular intervals along a circle centered on the rotary shaft.

In the synchronous electric motor 1C, a rotating magnetic field is generated in synchronism with an electric current flowing through the coil 24, and thus an attraction force or a repulsive force is generated between the coil 24 and the field magnet 32. In this way, a rotating force (magnet torque)

is generated in the field element 3. Further, in the synchronous electric motor 1C, the field magnet 32 is buried in the dust core 33, and therefore, saliency is generated, and thus a nature to generate a force such that a line of magnetic force passes through the shortest path can be utilized as a rotating force (reluctance torque). For this reason, an electric motor having high efficiency and high torque is obtained.

According to the field element 3 according to this embodiment, the same effects as the armature 2 according to the first embodiment are obtained. The field element 3 according to this embodiment can be manufactured by insert molding, and therefore, individual work to embed the field magnet 32 is not required, and thus manufacturing efficiency is high.

Further, it is possible to determine the outer shape of the dust core 33 without taking into account the presence of the field magnet 32, and therefore, it is possible to select a simple shape such as a cylindrical shape. In the dust core 33 having such a shape, at the time of forming thereof, forming with a large compressive force is possible, and it is easy to easily enhance the magnetic property and the mechanical strength. In this way, even if it is used in a use in which it is easy for a load to be applied, like the field element 3, the dust core 33 capable of realizing the field element 3 having sufficient durability and high dynamic characteristics is obtained.

Further, it becomes difficult for a gap to be formed between the field magnet 32 and the dust core 33, and thus it becomes easy to pass a magnetic flux through the dust core 33. In this way, even a magnetic flux which has not been able to be utilized hitherto can be used for the driving of the synchronous electric motor 1C, and thus it is possible to attain higher efficiency or higher torque of the synchronous electric motor 1C.

Further, even if the mechanical strength of the field magnet 32 is somewhat small, the field magnet 32 can be easily buried in the dust core 33, and therefore, at the time of selection of the field magnet 32, it is possible to make a magnetic property a top priority. As a result, it is possible to attain still higher efficiency and still higher torque of the synchronous electric motor 1C.

Further, it becomes difficult for the field magnet 32 to be exposed to the external environment, and therefore, time degradation of the field magnet 32 is suppressed. As a result, it is possible to increase the life of the synchronous electric motor 1C.

Furthermore, the field magnet 32 is buried, and therefore, it is difficult for the influence of the shape of the field magnet 32 to appear on the surface of the dust core 33. As a result, in the dust core 33, a loss (a windage loss) due to fluid resistance which the dust core 33 receives from air at the time of rotation can be suppressed to be sufficiently small.

Also in the synchronous electric motor 1C which is provided with the field element 3 as described above, the same effects as those in the first and second embodiments are obtained.

Fourth Embodiment

Next, a fourth embodiment of the electrically powered machine according to the invention will be described.

Figure 7:
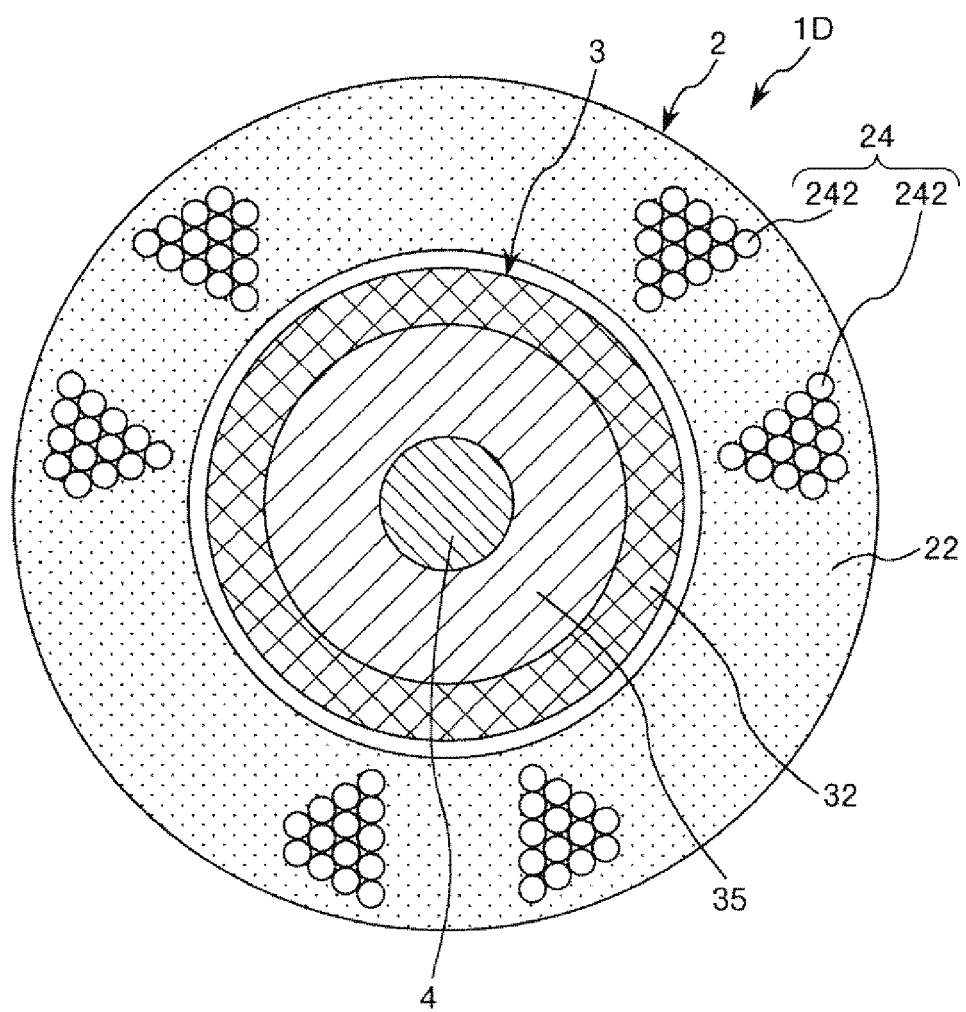
FIG. 7 is a cross-sectional view showing a brushless direct-current electric motor to which a fourth embodiment of the electrically powered machine according to the invention is applied.

FIG. 7 is a cross-sectional view showing a brushless direct-current electric motor to which the fourth embodiment of the electrically powered machine according to the invention is applied.

Hereinafter, the fourth embodiment will be described. However, in the following description, description will be made focusing on differences from the first to third embodiments described above, and with respect to the same matters, description thereof will be omitted. Further, in the drawing, the same matters as those in the embodiments described above are denoted by the same reference numerals.

A brushless direct-current electric motor 1D according to this embodiment is a radial gap type electric motor in which a gap separating the rotor and the stator from each other is located along the radial direction of the rotary shaft, similar to the direct-current electric motor 1A according to the first embodiment. Further, in the brushless direct-current electric motor 1D according to this embodiment, similar to the AG type brushless direct-current electric motor 1B according to the second embodiment, the armature 2 is provided with the dust core 22. The brushless direct-current electric motor 1D according to this embodiment is the same as the first to third embodiments except that this point is different.

The brushless direct-current electric motor 1D shown in FIG. 7 is a direct-current electric motor which is provided with the armature 2, the field element 3, and the shaft 4. In the brushless direct-current electric motor 1D, an electric current flowing through the coil 24 of the armature 2 is controlled by a transistor and the armature 2 is driven in synchronism with a switching period thereof.

The armature 2 (an embodiment of the armature according to the invention) shown in FIG. 7 is provided with the dust core 22 and three coils 24 buried in the dust core 22 and functions as a stator.

On the other hand, the field element 3 shown in FIG. 7 is provided with a base portion 35 which has a cylindrical shape and in which the shaft 4 is inserted on the inner diameter side thereof, and the field magnet 32 provided on the outer diameter side of the base portion 35 and having a cylindrical shape. The field element 3 is a so-called surface magnet type rotor.

According to the armature 2 according to this embodiment, the same effects as the armature 2 according to the first embodiment are obtained. The armature 2 according to this embodiment can be manufactured by insert molding, and therefore, individual work to embed the coil 24 is not required, and thus manufacturing efficiency is high.

Further, it is possible to determine the outer shape of the dust core 22 without taking into account the presence of the coil 24, and therefore, it is possible to select a simple shape such as a cylindrical shape. In the dust core 22 having such a shape, at the time of forming thereof, forming with a large compressive force is possible, and it is easy to easily enhance the magnetic property and the mechanical strength. In this way, even if it is used in a use in which it is easy for a load to be applied, like the armature 2, the dust core 22 capable of realizing the armature 2 having sufficient durability and high dynamic characteristics is obtained.

Further, it is not necessary to wind a conducting wire with respect to a core, and therefore, it is not necessary to provide a slot in the core, and it becomes possible to fill an area between the conducting wires of the coil 24 with magnetic powder. For this reason, even a magnetic flux which has not been able to be utilized hitherto can be used for the driving of the brushless direct-current electric motor 1D, and thus it is possible to attain higher efficiency or higher torque of the brushless direct-current electric motor 1D.

Further, it becomes difficult for the coil 24 to be exposed to the external environment, and therefore, time degradation of the coil 24 is suppressed. As a result, it is possible to increase the life of the brushless direct-current electric motor 1D.

Furthermore, the coil 24 is buried, and therefore, it is difficult for the influence of the shape of the coil 24 to appear on the surface of the dust core 22. For this reason, it is possible to bring the armature 2 sufficiently close to the field element 3, and thus it is possible to attain higher efficiency and higher torque of the brushless direct-current electric motor 1D.

Also in the brushless direct-current electric motor 1D which is provided with the armature 2 as described above, the same effects as those in the first to third embodiments are obtained.

Fifth Embodiment

Next, a fifth embodiment of the electrically powered machine according to the invention will be described.

Figure 8:
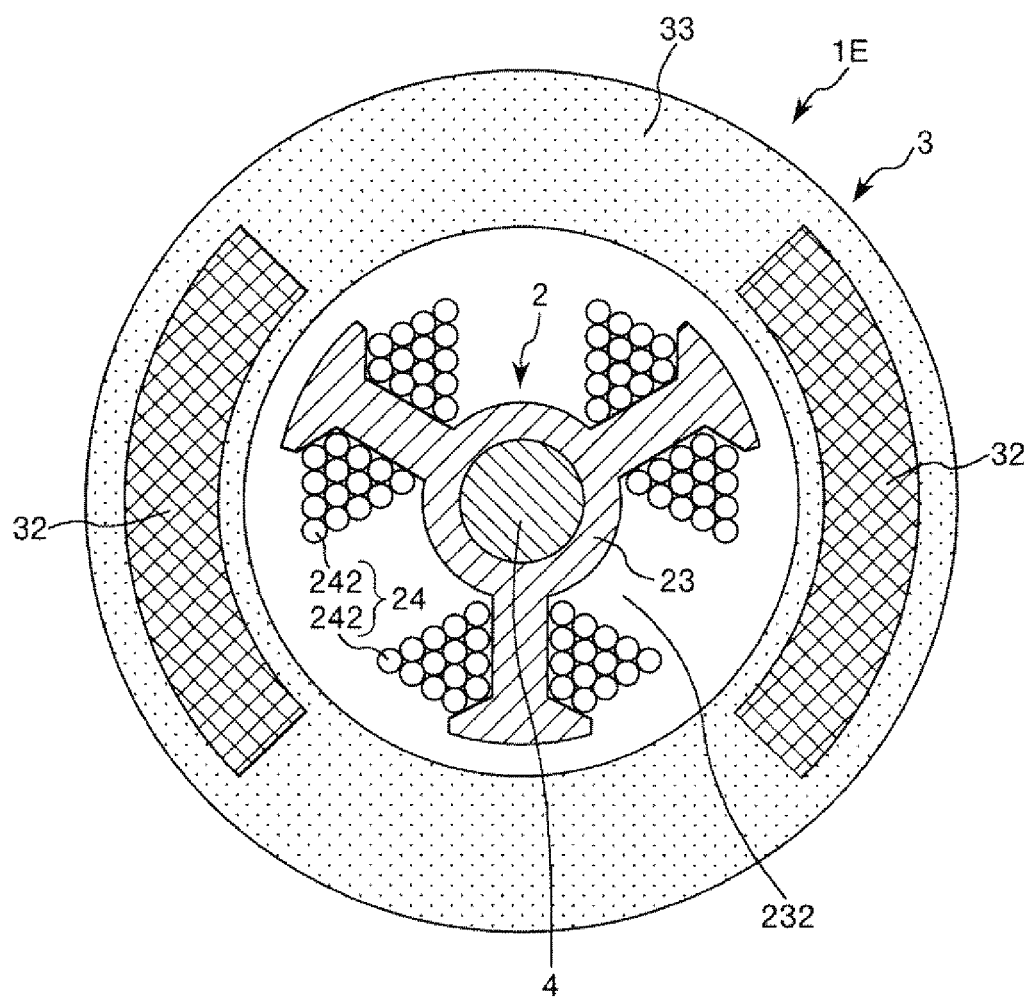
FIG. 8 is a cross-sectional view showing a direct-current electric motor (a DC motor) to which a fifth embodiment of the electrically powered machine according to the invention is applied.

FIG. 8 is a cross-sectional view showing a direct-current electric motor (a DC motor) to which the fifth embodiment of the electrically powered machine according to the invention is applied.

Hereinafter, the fifth embodiment will be described. However, in the following description, description will be made focusing on differences from the first to fourth embodiments described above, and with respect to the same matters, description thereof will be omitted. Further, in the drawing, the same matters as those in the embodiments described above are denoted by the same reference numerals.

A direct-current electric motor 1E according to this embodiment is the same as the direct-current electric motor 1A according to the first embodiment except that in the direct-current electric motor 1E, the core of the armature 2 is configured with a laminated body of electromagnetic steel sheets and the core of the field element 3 is configured with a dust core.

The direct-current electric motor 1E shown in FIG. 8 is a 3-pole brush-equipped direct-current electric motor which is provided with the armature 2 (a rotor), the field element 3 (a stator), and the shaft 4.

The armature 2 shown in FIG. 8 is provided with the magnetic core 23 configured with a laminated body of electromagnetic steel sheets, and three coils 24 provided inside of the magnetic core 23. The slot 232 is formed in the magnetic core 23, and a conducting wire is contained within the slot 232.

The field element 3 (an embodiment of the field element according to the invention) shown in FIG. 8 is provided with the dust core 33 (a core) configured with a compressed powder compact formed of magnetic powder, and two field magnets 32 buried in the dust core 33.

Of these, the dust core 33 is the same as the dust core 22 according to the first embodiment. The dust core 33 has a cylindrical shape, and the armature 2 is disposed on the inner diameter side of the cylinder.

The two field magnets 32 are disposed so as to satisfy a point-symmetric relationship with the rotary shaft as an axis of symmetry.

According to the field element 3 according to this embodiment, the same effects as the armature 2 according to the first embodiment are obtained. The field element 3 according to this embodiment can be manufactured by insert molding, and therefore, individual work to embed the field magnet 32 is not required, and thus manufacturing efficiency is high.

Further, it is possible to determine the outer shape of the dust core 33 without taking into account the presence of the field magnet 32, and therefore, it is possible to select a simple shape such as a cylindrical shape. In the dust core 33 having such a shape, at the time of forming thereof, forming with a large compressive force is possible, and it is easy to easily enhance the magnetic property and the mechanical strength. In this way, even if it is used in a use in which it is easy for a load to be applied, like the field element 3, the dust core 33 capable of realizing the field element 3 having sufficient durability and high dynamic characteristics is obtained.

Further, it becomes difficult for a gap to be formed between the field magnet 32 and the dust core 33, and thus it becomes easy to pass a magnetic flux through the dust core 33. In this way, even a magnetic flux which has not been able to be utilized hitherto can be used for the driving of the direct-current electric motor 1E, and thus it is possible to attain higher efficiency or higher torque of the direct-current electric motor 1E.

Further, even if the mechanical strength of the field magnet 32 is somewhat small, the field magnet 32 can be easily buried in the dust core 33, and therefore, at the time of selection of the field magnet 32, it is possible to make a magnetic property a top priority. As a result, it is possible to attain still higher efficiency and still higher torque of the direct-current electric motor 1E.

Further, it becomes difficult for the field magnet 32 to be exposed to the external environment, and therefore, time degradation of the field magnet 32 is suppressed. As a result, it is possible to increase the life of the direct-current electric motor 1E.

Furthermore, the field magnet 32 is buried, and therefore, it is difficult for the influence of the shape of the field magnet 32 to appear on the surface of the dust core 33. For this reason, it is possible to bring the armature 2 sufficiently close to the field element 3, and thus it is possible to attain higher efficiency and higher torque of the direct-current electric motor 1E.

Also in the direct-current electric motor 1E which is provided with the field element 3 as described above, the same effects as those in the first to fourth embodiments are obtained.

Method of Manufacturing Armature

Next, an embodiment of a method of manufacturing an armature according to the invention will be described.

Figure 9:
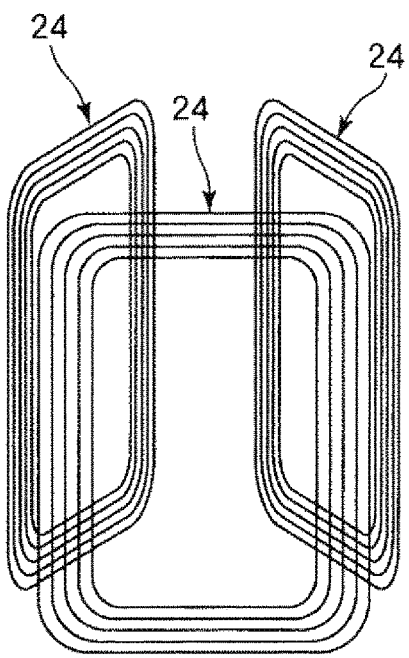
FIG. 9 is a diagram for explaining a method of manufacturing the armature shown in FIG. 2 (an embodiment of a method of manufacturing an armature according to the invention).
Figure 10:
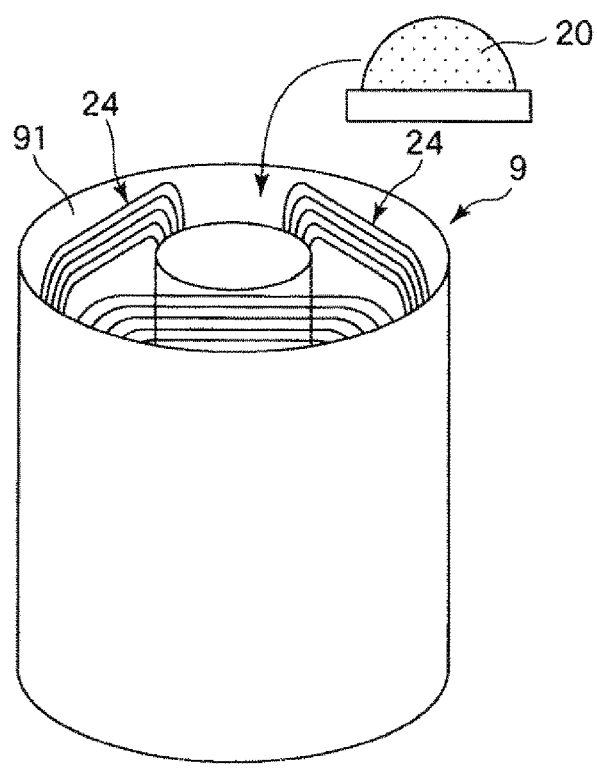
FIG. 10 is a diagram for explaining the method of manufacturing the armature shown in FIG. 2 (the embodiment of the method of manufacturing an armature according to the invention).
Figure 11:
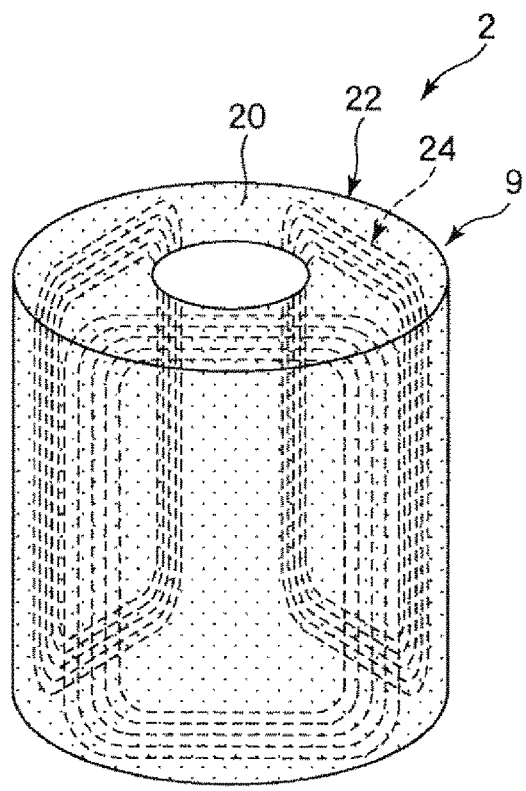
FIG. 11 is a diagram for explaining the method of manufacturing the armature shown in FIG. 2 (the embodiment of the method of manufacturing an armature according to the invention).

FIGS. 9 to 11 are diagrams for explaining a method of manufacturing the armature shown in FIG. 2 (an embodiment of a method of manufacturing an armature according to the invention).

The method of manufacturing an armature shown in FIGS. 9 to 11 includes: [1] a step of disposing the coil 24 in a cavity 91 of a forming die 9; [2] a step of supplying magnetic powder 20 into the cavity 91; and [3] a step of obtaining the dust core 22 by compacting the magnetic powder 20. Hereinafter, each step will be described.

[1] First, the coil 24 is prepared (refer to FIG. 9). The coil 24 is manufactured in advance by winding a conducting wire into a ring shape. In FIGS. 9 to 11, the coil 24 is shown in a simplified manner.

Subsequently, the forming die 9 is prepared, and the coil 24 is disposed in the cavity 91 (refer to FIG. 10). In a case of disposing a plurality of coils 24, the disposition is determined in consideration of the mutual positional relationship between the coils 24 in the armature 2.

As the forming die 9, for example, a die for press forming of powder metallurgy or a mold of an injection molding method is used. As necessary, holding means for holding the coil 24 may be used in order to dispose the coil 24 in the cavity 91 of the forming die 9.

[2] Next, the magnetic powder 20 is supplied into the cavity 91. As the magnetic powder 20, insulating layer-equipped soft magnetic powder which includes a particle of a soft magnetic material and an insulating layer covering the surface of the particle is used. In this way, even in a case where the particles of the magnetic powder 20 are in contact with each other, electrical conduction between the particles of the soft magnetic material is prevented, and thus the insulation property between the particles can be prevented from being reduced. As a result, in the dust core 22 which is obtained, an eddy current generation region is subdivided, and thus an eddy current loss can be suppressed to be small.

As a constituent material of the insulating layer, various glass materials which include $B_2O_3$, $SiO_2$, $Al_2O_3$, $Bi_2O_3$, ZnO, SnO, $P_2O_5$, or the like as a main component can be given as an example. Further, in the glass material, in addition to these components, an accessory component such as PbO, $Li_2O$, $Na_2O$, $K_2O$, MgO, CaO, SrO, BaO, $Gd_2O_3$, $Y_2O_3$, $La_2O_3$, or $Yb_2O_3$ may be included.

Further, as the constituent material of the insulating layer, more specifically, various glass materials such as sodium silicate glass, soda lime glass, borosilicate glass, lead glass, aluminosilicate glass, borate glass, phosphate glass, sulfate glass, and vanadate glass can be given as an example.

The glass materials as described above are excellent in chemical stability and insulation property, as compared to an organic material, and therefore, an insulating layer which can maintain a high insulation property over a long period of time is obtained.

Further, among such glass materials, a glass material having a softening point of less than or equal to 650° C. is preferably used, a glass material having a softening point of greater than or equal to 100° C. and less than or equal to 600° C. is more preferably used, and a glass material having a softening point of greater than or equal to 300° C. and less than or equal to 500° C. is further preferably used. By selecting a glass material such that a softening point falls within the above-described range, for example, when the magnetic powder 20 is heated after the forming of the magnetic powder 20, the particles are easily joined together. As a result, the dust core 22 having high mechanical strength is obtained.

In addition, the softening point of the glass material is a temperature measured by the softening point measuring method defined in JIS R 3103-1.

Further, as the glass material configuring the insulating layer, in particular, $SnO$—$P_2O_5$—$MgO$, $SnO$—$P_2O_5$, $Bi_2O_3$—$B_2O_3$—$ZnO$, $Bi_2O_3$—$ZnO$—$B_2O_3$, $SiO_2$—$Al_2O_3$—$B_2O_3$, $SiO_2$—$B_2O_3$—$Al_2O_3$, $SiO_2$—$B_2O_3$—$ZnO$, $Bi_2O_3$—$B_2O_3$, $ZnO$—$B_2O_3$—$SiO_2$, or the like is preferably used.

Further, in addition to this, a non-conductive inorganic material such as a ceramic material or a silicon material to the extent that does not impair the characteristics of the glass material may be added to the glass material configuring the insulating layer. The addition amount in this case is set to be less than or equal to 10% by mass, for example.

The average thickness of the insulating layer is not particularly limited. However, it is preferable that the average thickness of the insulating layer is in a range of greater than or equal to 0.1% and less than or equal to 5% of the average particle size of the particle of the soft magnetic material, and it is more preferable that the average thickness of the insulating layer is in a range of greater than or equal to 0.3% and less than or equal to 3% of the average particle size of the particle of the soft magnetic material. By setting the thickness of the insulating layer to be within the above-described range with respect to the particle of the soft magnetic material, it is possible to sufficiently absorb the irregularity of the particle surface of the soft magnetic material by the insulating layer. In this way, the magnetic powder 20 can secure a sufficient insulation property even if the particles thereof come into contact with each other.

More specifically, it is preferable that the average thickness of the insulating layer is in a range of greater than or equal to 5 nm and less than or equal to 3000 nm, and it is more preferable that the average thickness of the insulating layer is in a range of greater than or equal to 10 nm and less than or equal to 2000 nm. By setting the average thickness of the insulating layer to be within the above-described range, even in a case where the particles of the magnetic powder 20 come into contact with each other, electrical conduction between the particles of the soft magnetic material is prevented, and thus an insulation property between the particles can be prevented from being reduced.

In addition, the average thickness of the insulating layer is the average value of the thicknesses of the insulating layer at 10 points set approximately at regular intervals, obtained by observing a cross-section of the particle of the magnetic powder 20 with a microscope. Further, in a case where the particle size and the used amount of the particle of the soft magnetic material used at the time of the manufacturing of the magnetic powder 20 and the used amount of the insulating layer are known, it is also possible to determine the average thickness of the insulating layer by a calculation from these information.

Further, as a method of manufacturing the insulating layer-equipped soft magnetic powder, a method of attaching a glass material to the particle surface of soft magnetic powder can be given as an example. As the attaching method, a wet method such as a method of applying a liquid containing glass powder to soft magnetic powder, or a method of granulating soft magnetic powder while spraying a liquid containing glass powder, a dry method such as a method of fixing a glass material to the surface of soft magnetic powder, or the like can be given as an example. Of these, the method of mechanically fixing a glass material to the surface of soft magnetic powder is preferably used. Such a method can be performed under drying and can also be performed in an inert gas, as necessary. For this reason, a concern that moisture or the like may be interposed between the soft magnetic powder and the insulating layer is reduced, and thus transformation or degradation of the magnetic powder 20 can be suppressed over a long period of time. Further, due to mechanically fixing a glass material to the surface of soft magnetic power, even if foreign matter, an oxide film, or the like is attached to the surface of the soft magnetic powder, it is possible to form an insulating layer while removing or destroying them. For this reason, in the insulating layer-equipped soft magnetic powder, the adhesion of the insulating layer is increased and an eddy current loss can be more reliably suppressed.

Further, according to this method, even a glass material in which a softening point is high and handling is difficult can be coated as an insulating layer. For this reason, it is useful in that it is possible to use a wide variety of glass materials.

As the method of mechanically fixing a glass material to the surface of soft magnetic powder, a method of applying a device for generating mechanical compression action and friction action in mixed powder of soft magnetic powder and glass powder can be given as an example. As such a device, various pulverizers such as a hammer mill, a disk mill, a roller mill, a ball mill, a planetary mill, and a jet mill, various friction mixers such as Angmill (registered trademark), high-speed oval type mixer, Mix muller (registered trademark), Jacobson mill, Mechanofusion (registered trademark), and Hybridization (registered trademark), or the like can be given as an example. In these devices, it is considered that the glass powder is pressed against the surface of the soft magnetic powder and the particle surfaces are fused together. As a result, insulating layer-equipped soft magnetic powder in which a glass material is fixed to the particle surface of soft magnetic powder is obtained.

Further, the magnetic powder 20 may be supplied into the cavity 91 in the state of granulated powder or a kneaded product. At this time, a resin material along with the magnetic powder 20 may be added to the granulated powder or the kneaded product, as necessary. Such a resin material binds the particles of the magnetic powder 20 to each other, whereby the mechanical strength of a compact is secured and the insulation property between the particles is further increased. For this reason, in the dust core 22 which is obtained, an eddy current generation region is particularly subdivided, and thus an eddy current loss can be particularly suppressed to be small.

Further, in a case where the resin material is not added, the mechanical strength of a compact may be secured by joining the insulating layers to each other or by adding an inorganic insulating material instead of the resin material. Further, in a case where a soft magnetic material contains a ferrite, it is also possible to configure the dust core 22 by joining (sintering) the particles of the magnetic powder 20 together.

As such a resin material, silicone resin, epoxy resin, phenolic resin, polyamide resin, polyimide resin, silicate resin, urethane resin, acrylic resin, polyester resin, polyolefin resin, fluorine-based resin, liquid crystal polymer resin, polyphenylene sulfide-based resin, waxes, higher fatty acid, alcohols, fatty acid metal, a nonionic surfactant, a silicone-based lubricant, or the like can be given as an example.

Of these, epoxy resin can be preferably used. Since epoxy resin has a high insulation property and the mechanical characteristic is also good, epoxy resin is suitable as a resin material which is added along with the magnetic powder 20.

Further, as necessary, a material other than the resin material, for example, an inorganic insulating material such as a glass material, a ceramic material, or a silicon material, may be contained in the cavity 91.

[3] Next, the dust core 22 is obtained by compacting the magnetic powder 20 (refer to FIG. 11). In FIG. 11, the inside of the forming die 9 is shown in a transparent state.

For the compacting, for example, a press forming method, an injection molding method, or the like is applied.

In this way, the particles of the magnetic powder 20 are brought in close contact with each other and shape retention is secured, and thus a compact is obtained.

A compacting pressure at this time is not particularly limited. However, it is preferable that the compacting pressure is in a range of greater than or equal to 1 MPa and less than or equal to 3000 MPa (greater than or equal to 0.01 t/cm$^2$ and less than or equal to 30 t/cm$^2$).

Thereafter, as necessary, the obtained compact is heated. In this way, the resin material is melted and then solidified or hardened, whereby the particles of the magnetic powder 20 are fixed to each other. As a result, it is possible to further enhance the mechanical strength of the dust core 22.

It is preferable that a heating temperature at this time is in a range of greater than or equal to 130° C. and less than or equal to 180° C., and it is preferable that a heating time is in a range of greater than 5 minutes and less than or equal to 2 hours. Further, the heating may be performed simultaneously with the forming and may be performed at both of during the forming and after the forming.

Further, a heating atmosphere is also not particularly limited and may be an oxidizing gas atmosphere, a reducing gas atmosphere, or the like. However, in light of transformation or degradation of the soft magnetic material or the insulating layer, it is preferable that the heating atmosphere is an inert gas atmosphere such as nitrogen gas or argon gas or a reduced-pressure atmosphere, and in particular, an inert gas atmosphere is more preferably.

In addition, in the above description, a manufacturing method in a case where the armature 2 functions as a rotor has been described. However, the armature 2 which is manufactured may be an armature functioning as a stator. That is, it is possible to manufacture the armatures 2 shown in FIGS. 5 and 7 by the method of manufacturing an armature according to this embodiment.

Method of Manufacturing Field Element

Next, an embodiment of a method of manufacturing a field element according to the invention will be described.

Figure 12:
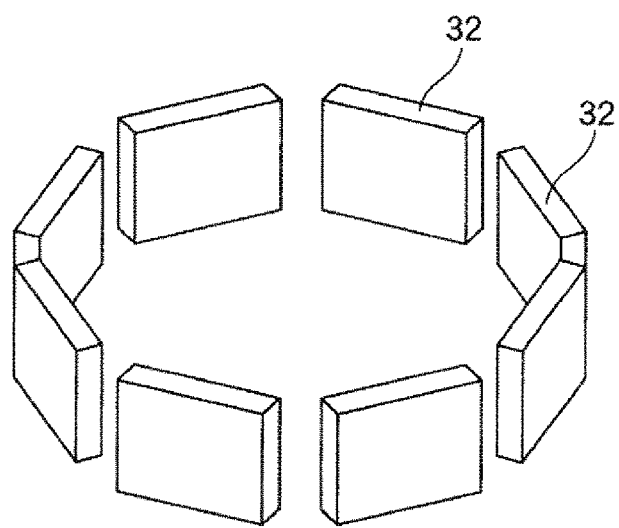
FIG. 12 is a diagram for explaining a method of manufacturing a field element shown in FIG. 6 (an embodiment of a method of manufacturing a field element according to the invention).
Figure 13:
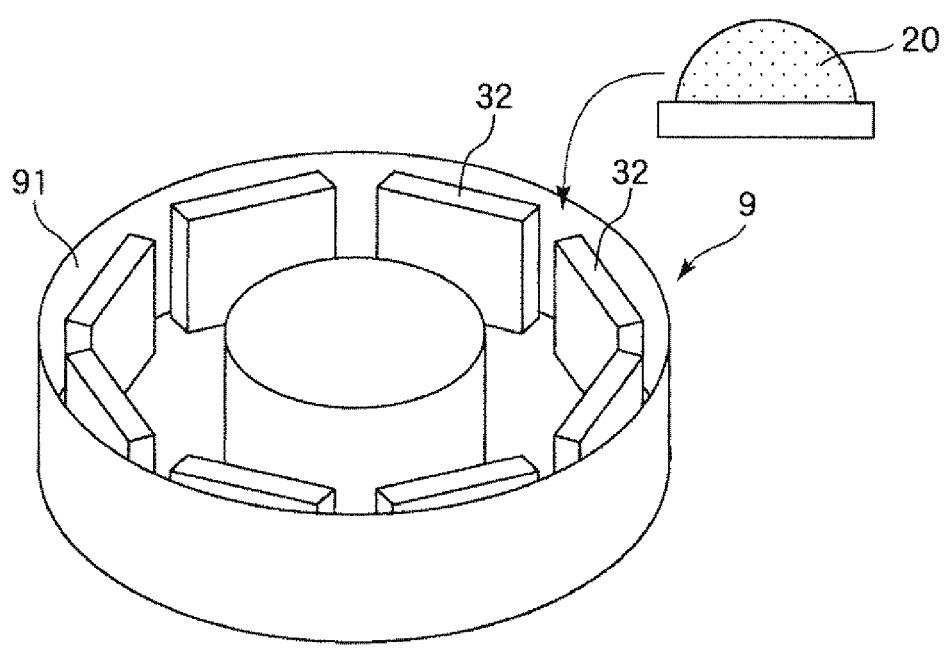
FIG. 13 is a diagram for explaining the method of manufacturing the field element shown in FIG. 6 (the embodiment of the method of manufacturing a field element according to the invention).

FIGS. 12 and 13 are diagrams for explaining a method of manufacturing the field element shown in FIG. 6 (an embodiment of a method of manufacturing a field element according to the invention).

Hereinafter, the method of manufacturing a field element according to this embodiment will be described. However, in the following description, description will be made focusing on differences from the method of manufacturing an armature according to the embodiment described above, and with respect to the same matters, description thereof will be omitted.

The method of manufacturing a field element shown in FIGS. 12 and 13 includes: [1] a step of disposing the field magnet 32 in the cavity 91 of the forming die 9; [2] a step of supplying the magnetic powder 20 into the cavity 91; and [3] a step of obtaining the dust core 33 by compacting the magnetic powder 20. Hereinafter, each step will be described.

[1] First, the field magnet 32 is prepared (refer to FIG. 12).

Subsequently, the forming die 9 is prepared, and the field magnet 32 is disposed in the cavity 91 (refer to FIG. 13). In a case of disposing a plurality of field magnets 32, the disposition is determined in consideration of the mutual positional relationship between the field magnets 32 in the field element 3.

As the forming die 9, for example, a die for press forming of powder metallurgy or a mold of an injection molding method is used. As necessary, holding means for holding the field magnet 32 may be used in order to dispose the field magnet 32 in the cavity 91 of the forming die 9.

[2] Next, the magnetic powder 20 is supplied into the cavity 91.

[3] Next, the dust core 33 shown in FIG. 6 is obtained by compacting the magnetic powder 20.

In addition, in the above description, a manufacturing method in a case where the field element 3 functions as a rotor has been described. However, the field element 3 which is manufactured may be a field element functioning as a stator. That is, it is possible to manufacture the field element 3 shown in FIG. 8 by the method of manufacturing a field element according to this embodiment.

The armature, the field element, the method of manufacturing an armature, the method of manufacturing a field element, and the electrically powered machine according to the invention have been described above based on the illustrated embodiments. However, the invention is not limited thereto.

For example, in the armature, the field element, and the electrically powered machine according to the invention, it is possible to change the configuration of each section according to the above-described embodiments to any configuration having the same function, and it is also possible to add any configuration thereto.

Further, in the method of manufacturing an armature and the method of manufacturing a field element according to the invention, any step may be added to the configurations according to the above-described embodiments.

Further, in the electrically powered machine according to the invention, a configuration which is obtained by replacing the configuration of each section with each other between the above-described embodiments is also acceptable.

What is claimed is:

1. An armature comprising:
    a dust core which includes magnetic powder; and
    a coil buried in the dust core, the coil including a plurality of separate windings, and each of the separate windings includes a plurality of concentrically arranged and spaced apart closed loops, the plurality of closed loops including an outer loop that entirely surrounds and is entirely spaced apart from a plurality of interior loops that each have a different diameter and are entirely spaced apart from each other,
    wherein the magnetic powder includes a plurality of particles each composed of a soft magnetic material, an insulating layer that is mechanically fixed to and covers a surface of each particle, and an average particle size of each of the particles is in the range of 1 to 20 µm, and
    the insulating layer includes a sodium-silicate glass material having a softening point that is less than or equal to 650° C.

2. An electrically powered machine comprising:
    the armature according to claim 1.

3. The armature according to claim 1, wherein the dust core has a columnar shape or a cylindrical shape.

4. An electrically powered machine comprising:
    the armature according to claim 3.

5. The armature according to claim 1, wherein the coil includes a winding section which is configured by winding a conducting wire, and terminal sections which are configured at both end portions of the conducting wire, and
    an entirety of the winding section is buried in the dust core.

6. An electrically powered machine comprising:
    the armature according to claim 5.

* * * * *